US007167985B2

(12) United States Patent
Ahmed

(10) Patent No.: US 7,167,985 B2
(45) Date of Patent: Jan. 23, 2007

(54) SYSTEM AND METHOD FOR PROVIDING TRUSTED BROWSER VERIFICATION

(75) Inventor: Khaja Ahmed, Pleasanton, CA (US)

(73) Assignee: Identrus, LLC, New York, NY (US)

( * ) Notice: Subject to any disclaimer, the term of this patent is extended or adjusted under 35 U.S.C. 154(b) by 425 days.

(21) Appl. No.: 09/845,221

(22) Filed: Apr. 30, 2001

(65) Prior Publication Data

US 2002/0162003 A1 Oct. 31, 2002

(51) Int. Cl.
*H04L 9/00* (2006.01)

(52) U.S. Cl. ............... 713/176; 713/175; 713/181; 713/182; 380/255; 705/35

(58) Field of Classification Search ............... 713/175, 713/176, 200, 201; 705/1, 35; 380/255
See application file for complete search history.

(56) References Cited

U.S. PATENT DOCUMENTS

| | | | |
|---|---|---|---|
| 5,638,446 A | | 6/1997 | Rubin |
| 5,659,616 A | | 8/1997 | Sudia |
| 5,689,565 A | * | 11/1997 | Spies et al. ................. 713/189 |
| 5,717,989 A | | 2/1998 | Tozzoli et al. |
| 5,790,677 A | * | 8/1998 | Fox et al. ..................... 705/78 |
| 5,958,051 A | * | 9/1999 | Renaud et al. ............... 713/200 |
| 6,105,012 A | * | 8/2000 | Chang et al. ................. 705/64 |
| 6,157,721 A | | 12/2000 | Shear et al. |
| 6,157,917 A | * | 12/2000 | Barber ........................ 705/26 |
| 6,185,683 B1 | | 2/2001 | Ginter et al. |
| 6,292,569 B1 | | 9/2001 | Shear et al. |
| RE38,070 E | * | 4/2003 | Spies et al. ................. 380/277 |
| 6,560,581 B1 | * | 5/2003 | Fox et al. ..................... 705/51 |
| 2002/0095579 A1 | * | 7/2002 | Yoshiura et al. ............ 713/176 |
| 2002/0124172 A1 | * | 9/2002 | Manahan ..................... 713/176 |
| 2002/0128940 A1 | * | 9/2002 | Orrin et al. ................... 705/35 |
| 2005/0114666 A1 | * | 5/2005 | Sudia ........................... 713/175 |

* cited by examiner

*Primary Examiner*—Nasser Moazzami
*Assistant Examiner*—Carl Colin
(74) *Attorney, Agent, or Firm*—Sonnenschein Nath & Rosenthal LLP

(57) ABSTRACT

A system and method for providing trusted browser verification services. In a preferred embodiment, these services are provided within the context of a four-corner trust model comprising a subscribing customer and a relying customer, engaged in an on-line transaction. The subscribing and relying customers are preferably customers of first and second financial institutions, respectively, that issue to them hardware tokens for their respective private keys and digital certificates. The buyer is preferably provided with a Web browser to conduct electronic transactions. A distinct-trusted verifier or other entity ensures in a verifiable manner that the browser used by the subscribing customer does not contain any code that is not trusted by verifying the digital signatures on each running browser component of the subscribing customer's browser and ensuring that the signature was applied by an entity that is authorized to certify the trustworthiness of the component.

79 Claims, 12 Drawing Sheets

| PURCHASE ORDER | DIGITAL SIGNATURE OF EACH SIGNED COMPONENT RUNNING IN THE BROWSER ENVIRONMENT |
|---|---|

| PURCHASE ORDER | DIGITAL SIGNATURE OF EACH SIGNED COMPONENT RUNNING IN THE BROWSER ENVIRONMENT | UNSIGNED CODE RUNNING IN BROWSER ENVIRONMENT |
|---|---|---|

| PURCHASE ORDER | DIGITAL SIGNATURE OF EACH SIGNED COMPONENT RUNNING IN THE BROWSER ENVIRONMENT | UNSIGNED CODE RUNNING IN BROWSER ENVIRONMENT | CODE OF EACH SIGNED COMPONENT RUNNING IN THE BROWSER ENVIRONMENT |
|---|---|---|---|

FIG. 8

|  | HASHES MATCH | HASHES DO NOT MATCH |
|---|---|---|
| IDENTITY OF SIGNER KNOWN, AUTHORIZED ENTITY | GOOD | BAD |
| IDENTITY OF SIGNER KNOWN, UNAUTHORIZED ENTITY | UNKNOWN | BAD |
| IDENTITY OF SIGNER UNKNOWN | UNKNOWN | BAD |

FIG. 9

|  | HASHES MATCH | HASHES DO NOT MATCH |
|---|---|---|
| IDENTITY OF SIGNER KNOWN, AUTHORIZED ENTITY | GOOD | BAD |
| IDENTITY OF SIGNER KNOWN, UNAUTHORIZED ENTITY | BAD | BAD |
| IDENTITY OF SIGNER UNKNOWN | UNKNOWN | BAD |

FIG. 10

SYSTEM AND METHOD FOR PROVIDING TRUSTED BROWSER VERIFICATION

BACKGROUND OF THE INVENTION

The world of electronic commerce has created new challenges to establishing relationships between contracting parties. One of those challenges springs from the fact that the parties to the transaction can not see or hear each other, and can not otherwise easily confirm each other's identity and authority to act.

One remedy for this problem is to provide each contracting party with a private key for signing transmitted messages. The signing party makes available an associated public key that decrypts messages signed with the party's private key, and thus enables a receiving party to confirm the identity of the sender.

But the sender's public key may not be known a priori to the recipient. In that event, the sender may transmit with its signed message a digital certificate issued by a Certification Authority. The certificate is itself a signed electronic document (signed with the private key of the Certification Authority) certifying that a particular public key is the public key of the sender. A system that implements such a solution is called a Public Key Infrastructure.

Another challenge facing electronic commerce is ensuring the trustworthiness of software, such as a Web browser, used by contracting parties to conduct electronic transactions. Because these transactions take place over a computer network such as the Internet, a transacting party's Web browser may be exposed to viruses, trojans and other malicious programs. Such programs may corrupt the browser and may destroy the confidence of the parties that an electronic transaction will be carried out according to their intentions. For example, if a buying party's browser is corrupt, then the buying party can not be assured that the buying party's signature will not be affixed to a transaction that the buying party did not know of, did not authorize, or whose contents have been altered without the buying party's knowledge. And a selling party can not be assured that a completed transaction will not later be refuted by the buying party. A corrupt browser may thus compromise the ability of the parties to conduct secure electronic commerce.

SUMMARY OF THE INVENTION

A system and method are disclosed for providing trusted browser verification. In a preferred embodiment, this verification is provided within the context of a four-corner trust model. The four-corner model comprises a buyer, also referred to as the subscribing customer, and a seller, also referred to as the relying customer, who engage in an on-line transaction.

In a preferred embodiment, the buyer is a customer of a first financial institution, referred to as an issuing participant. The issuing participant acts as a Certification Authority for the buyer and issues the buyer a hardware token for the buyer's private key and a digital certificate of the buyer's public key signed by the issuing participant. Preferably, the buyer is provided with a Web browser to communicate with the sellers' Web site and conduct electronic transactions.

In a preferred embodiment, the seller is a customer of a second financial institution, referred to as the relying participant. The relying participant acts as a Certification Authority for the seller and issues the seller a hardware token for the seller's private key and a digital certificate signed by the relying participant. The system also includes a root Certification Authority that issues digital certificates to the issuing and relying participants.

In a preferred embodiment, the present system and method also comprises a trusted verifier. The trusted verifier ensures in a verifiable manner that the browser used by the buyer does not contain any code that is not trusted. The trusted verifier determines the status of the buyer's browser by verifying the digital signatures on each running browser component and ensuring that the signature was applied by an entity that is authorized to certify the trustworthiness of the component. In addition, the trusted verifier may compare a hash of the running browser components to known-good hashes for those components.

In a preferred embodiment, the status of the buyer's browser may be either good, bad, or unknown. If the browser status is good, then all code running in the browser environment is trusted. If the browser status is bad, then the browser contains code that can not be trusted. If the browser status is unknown, then it can not be determined whether or not the browser contains any code that can not be trusted.

Because the trusted verifier ensures that the buyer's browser may be trusted, the buyer may be assured that the buyer's signature will not be affixed to an electronic transaction that the buyer did not know of, did not authorize, or whose contents have been altered without the buyer's knowledge. In addition, the seller may be assured that a signed electronic transaction will not later be refuted by the buyer. Thus, the trusted verifier enhances the ability of the contracting parties to conduct secure electronic commerce in the present system.

The features and advantages described in the specification are not all inclusive, and many additional features and advantages will be apparent to one of ordinary skill in the art in view of the drawings, specification, and claims hereof.

BRIEF DESCRIPTION OF THE DRAWINGS

The above summary of the invention will be better understood when taken in conjunction with the following detailed description and accompanying drawings, in which:

FIG. 8 illustrates the digitally signed content including authenticated or signed attributes in three preferred embodiments of the present invention;

FIG. 9 illustrates one preferred embodiment of a rule set for determining the value of a browser status response;

FIG. 10 illustrates a second preferred embodiment of a rule set for determining the value of a browser status response;

DETAILED DESCRIPTION OF THE PREFERRED EMBODIMENTS

The present disclosure relates to a system and method for providing trusted browser verification. In a preferred embodiment, this verification is provided within the context of a four-corner trust model. A preferred embodiment of the four-corner model is shown in FIG. 1.

Figure 1:
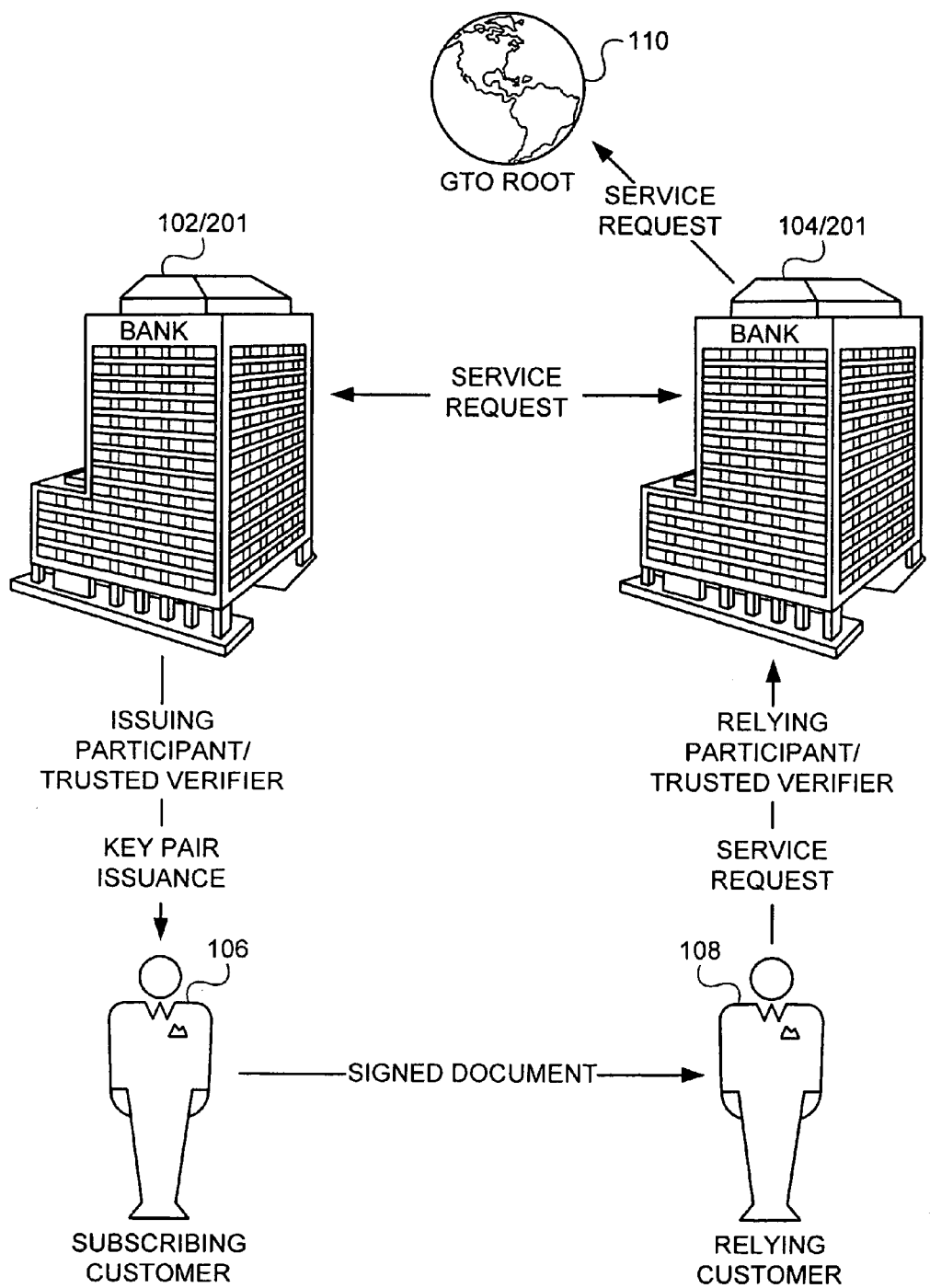
FIG. 1 is a block diagram of a preferred embodiment of the four-corner model employed by the present system.

As shown in FIG. 1, the four-corner model preferably comprises a first institution 102 and a second institution 104. First institution 102 is referred to as the "issuing participant" because it is a participant in the present system and it issues smart cards to its customers, as described below. Second institution 104 is referred to as the "relying participant" because it is a participant in the present system and it enables its customers to rely on representations made by issuing participant 102 and issuing participant 102's customers, as described below. Participants 102, 104 may preferably be banks or other financial institutions.

Also shown in FIG. 1 are a first customer 106 and a second customer 108. First customer 106 and second customer 108 are preferably customers of issuing participant 102 and relying participant 104, respectively. First customer 106 is referred to as the "subscribing customer" because this customer subscribes to services provided by issuing participant 102. First customer 106 is also referred to as the "buyer" because it typically fills that role in transactions with second customer 108, as described below.

Second customer 108 is referred to as the "relying customer" because it relies on representations made by both issuing participant 102 and subscribing customer 106. Second customer 108 is also referred to as the "seller" because it typically fills that role in transactions with first customer 106, as described below. It should be recognized, however, that although the description below may speak in terms of a buyer 106 and a seller 108, first customer 106 and second customer 108 may instead have different roles in a given transaction. For example, first customer 106 may be a borrower repaying a loan to second customer 108. In fact, the transaction may be any electronic communication or assertion by subscribing customer 106 to relying customer 108 that relying customer 108 needs to rely upon and trust.

Also shown in FIG. 1 is a root entity 110. Root entity 110 is typically an organization that establishes and enforces a common set of operating rules for facilitating electronic commerce and electronic communications. Root entity 110 may be owned jointly by a plurality of banks and/or other financial institutions that have agreed to adhere to these operating rules. Exemplary embodiments of such a root entity are described in copending application Ser. No. 09/502,450, filed Feb. 11, 2000, entitled System and Method for Providing Certification Related and Other Services and in copending application Ser. No. 09/657,623, filed Sep. 8, 2000, entitled System and Method for Providing Certificate-Related and Other Services, which are hereby incorporated by reference.

In a preferred embodiment, the system of FIG. 1 also comprises one or more trusted verifiers 201 shown in FIG. 1 as part of participants 102, 104. As discussed below, the trusted verifier 201 ensures the trustworthiness of Web browsers used by customers 106, 108. The trustworthiness of a customer's Web browser may be compromised by viruses or other means. The trusted verifier 201 allows relying parties to determine the verifiable trustworthiness of a browser.

Figure 2:
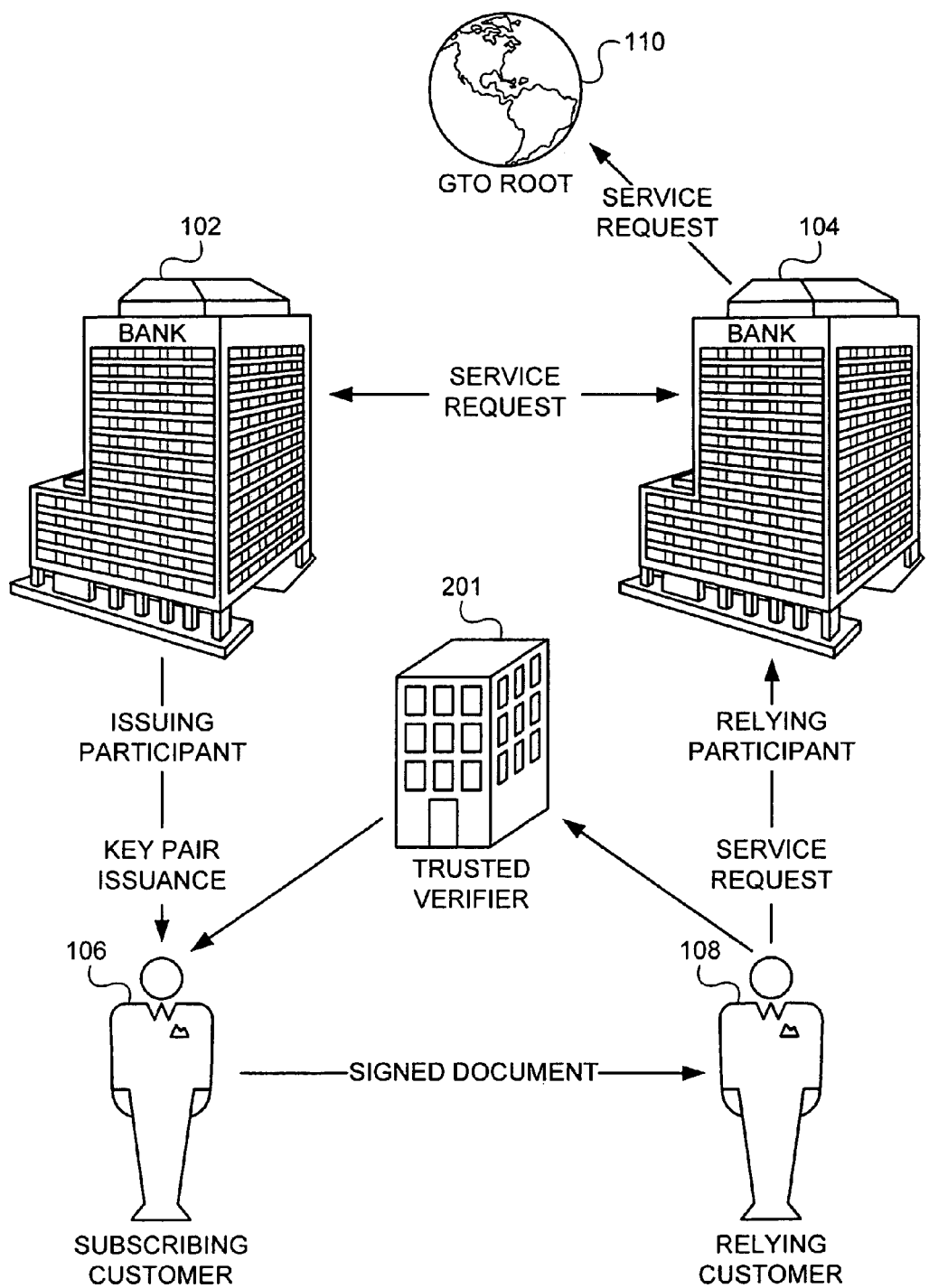
FIG. 2 schematically illustrates a first preferred embodiment of the present system that employs a distinct trusted verifier entity.
Figure 3:
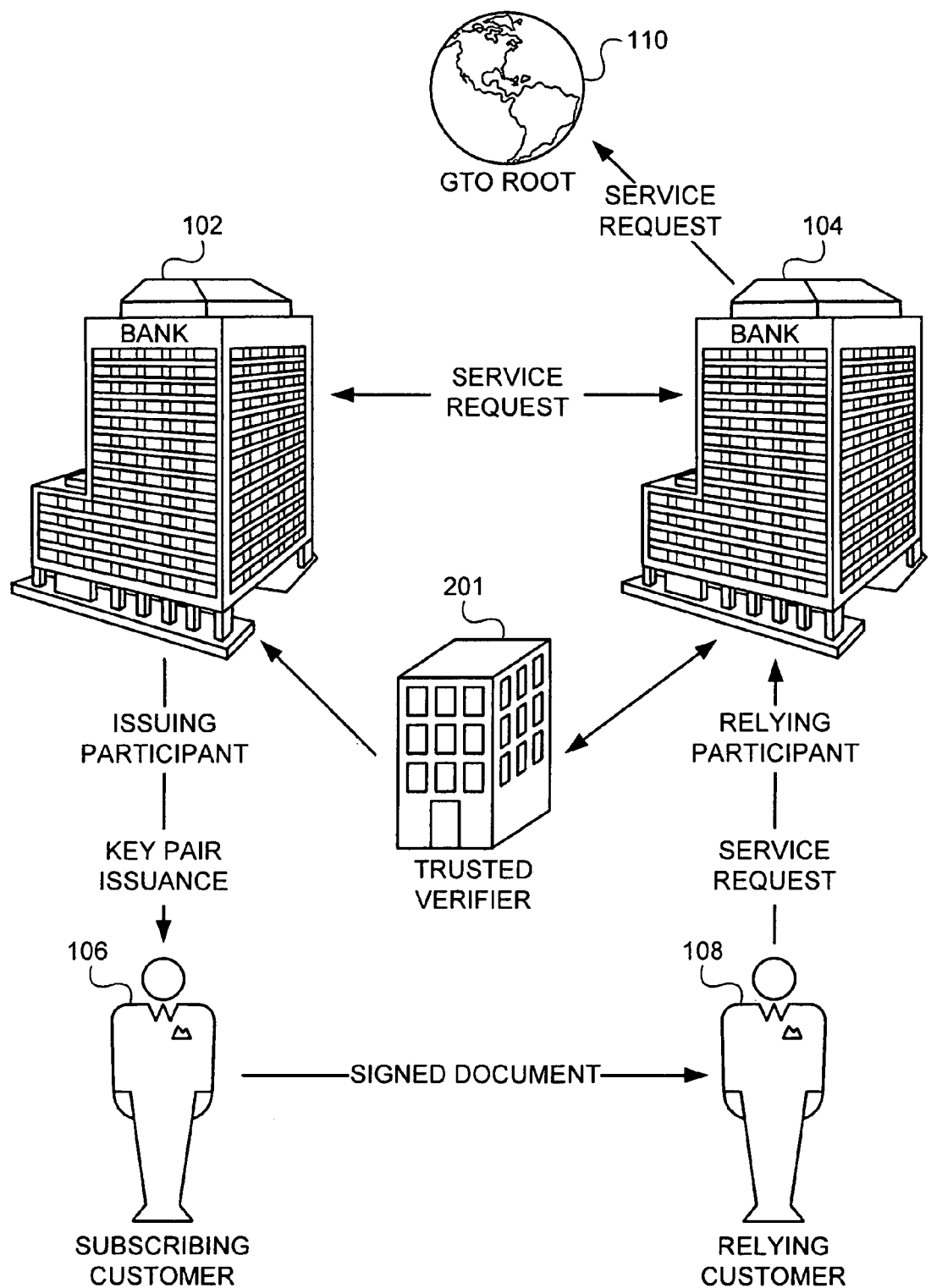
FIG. 3 schematically illustrates a second preferred embodiment of the present system that also employs a distinct trusted verifier entity.

In some preferred embodiments, each participant may serve as a trusted verifier 201 as shown in FIG. 1. These embodiments will be referred to herein as participant-verifier embodiments. In other preferred embodiments, trusted verifier 201 may be a separate entity as shown in FIG. 2. These embodiments will be referred to herein as distinct-verifier embodiments. In a preferred distinct-verifier embodiment, customers may seek services directly from trusted verifier 201, as shown in FIG. 2, and as described in more detail below. Alternatively, customers may seek services from trusted verifier 201 via a participant 102, 104 as shown in FIG. 3.

Figure 4:
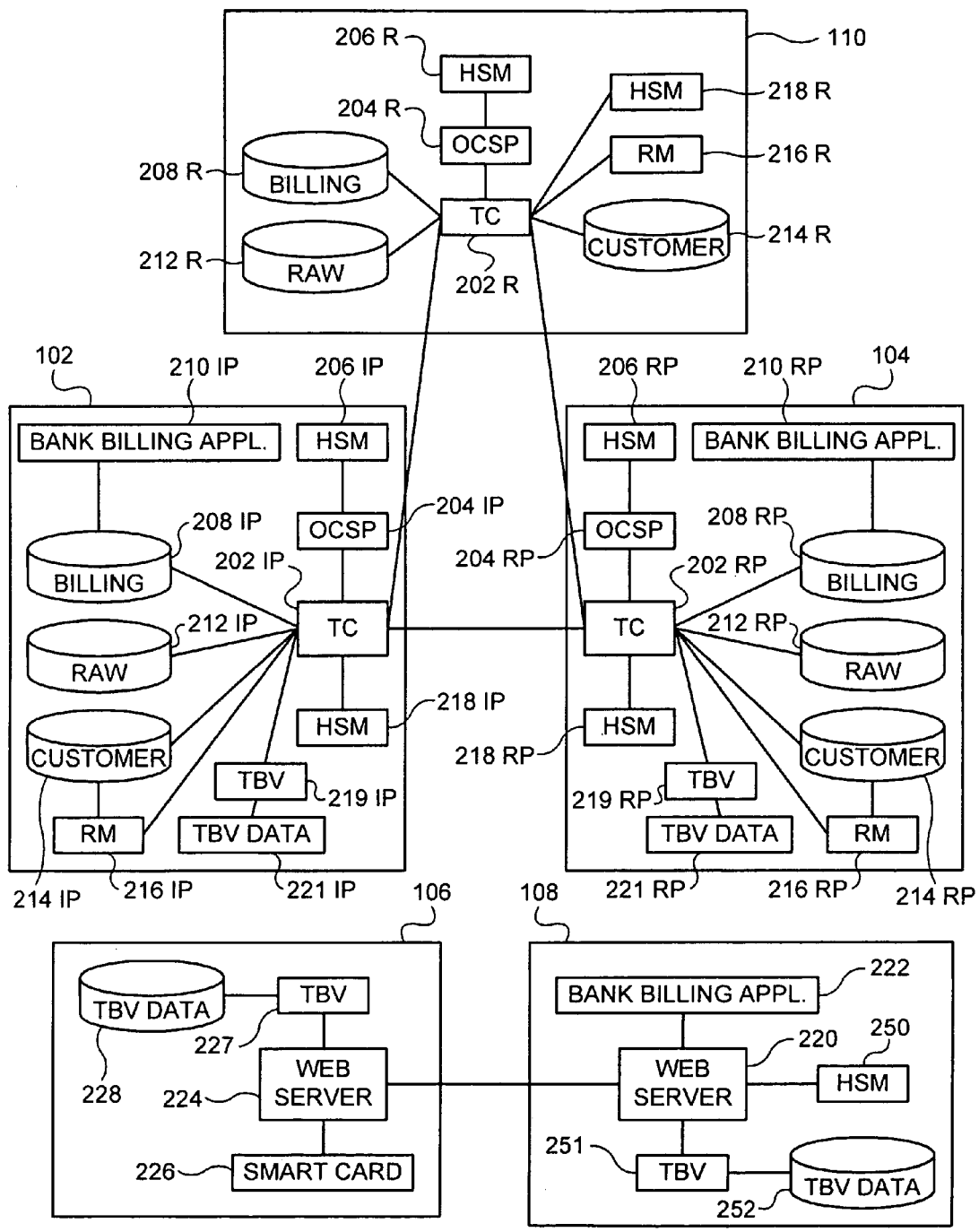
FIG. 4 schematically illustrates the components preferably provided at each entity in the four-corner model.

FIG. 4 schematically illustrates the components preferably provided at each entity in the present system. As shown in FIG. 4, participants 102, 104, and root entity 110 are each preferably provided with a transaction coordinator 202 that serves as a gateway for transmitting and receiving all inter-entity messages related to services provided by the present system. Each transaction coordinator 202 is preferably provided with an associated hardware security module (HSM) 218 for signing and verifying messages. Transaction coordinators 202 provide a single interface to issuing participant 102's and relying participant 104's on-line services and implement safeguards necessary to ensure secure electronic communications between transaction coordinators 202 and other entities in the four-corner model, as described in copending U.S. patent application Ser. No. 09/657,605, filed on Sep. 8, 2000, entitled System and Method for Providing Certificate Validation and Other Services, which is hereby incorporated by reference.

Participants 102, 104, and root entity 110 are each further preferably provided with an Online Certificate Status Protocol (OCSP) responder 204 and associated HSM 206 for signing certificate status responses and verifying signatures on certificate status requests. In addition, each participant 102, 104 and root entity 110 is further preferably provided with a billing database 208 (connected to a bank billing application 210 in the case of participants 102, 104), a raw transaction log 212, a customer database 214, a risk manager 216 (connected to customer database 214), and a hardware security module 218, each of which is connected to transaction coordinator 202. Each of these components is more fully described in the above-cited application Ser. No. 09/657,605.

Figure 5:
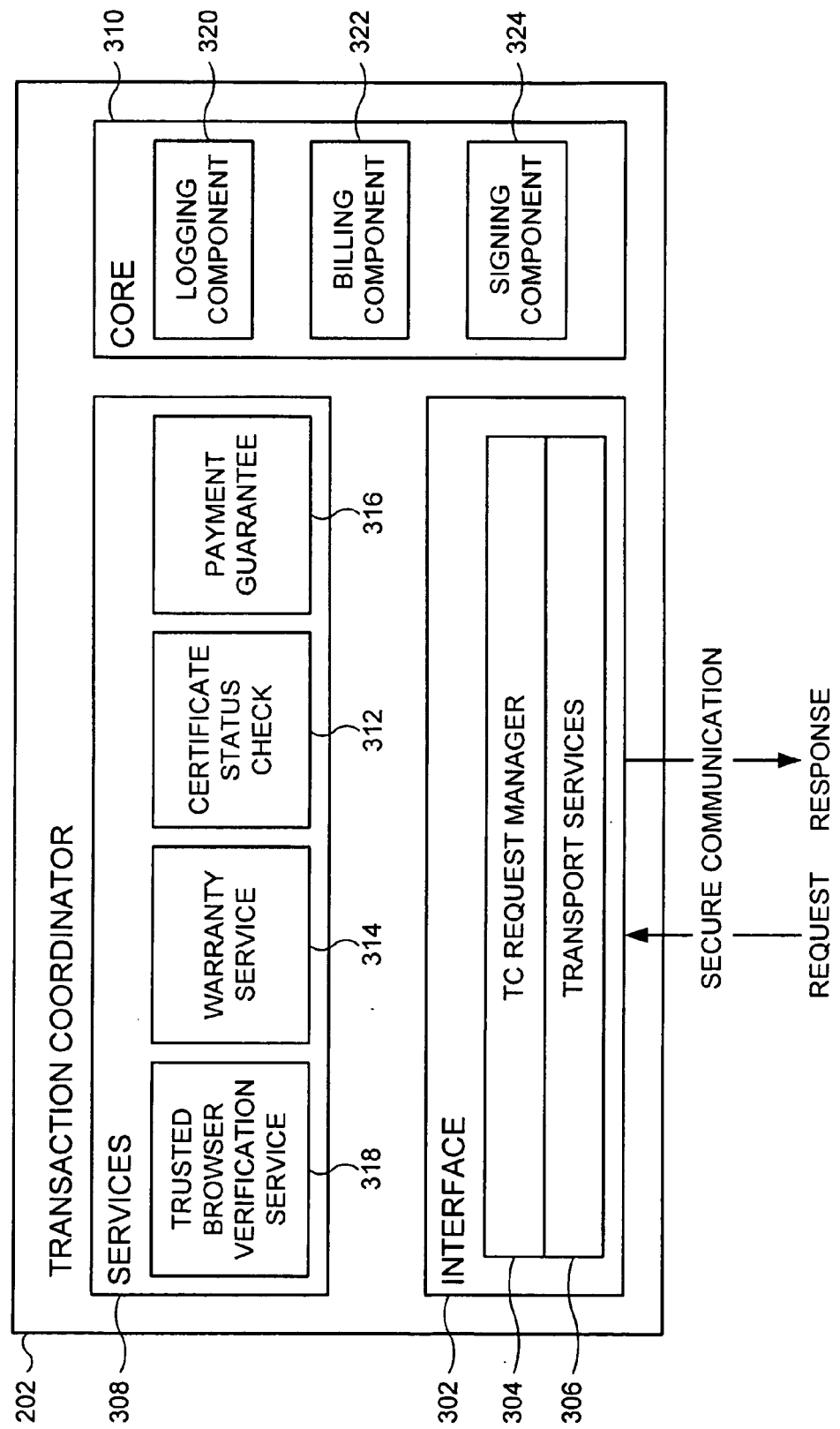
FIG. 5 is a block diagram of a preferred embodiment of a transaction coordinator adapted to provide a trusted browser verification service.

FIG. 5 illustrates a preferred embodiment of a transaction coordinator incorporating a trusted browser verification service 318. Transaction coordinator 202 preferably comprises an interface 302 comprising two components: a TC request manager 304 and a transport services component 306. Interface 302 passes communications to and from a plurality of service modules 308 and core components 310. Service modules 308 preferably include a trusted browser verification service 318. The interface components, the core components, and the other service modules shown in FIG. 5 are described in the above-cited application, Ser. No. 09/657,605.

Each participant is also preferably provided with a trusted browser verification component 219 and a trusted component database 221, as shown in FIG. 4. Transaction coordinator 202 is configured to transmit and receive messages from trusted browser verification component 219. Trusted browser verification component 219 comprises code that is adapted to create hashes, compare hashes, sign hashes, verify signatures, store signatures, retrieve signatures, send and receive signatures, and generate a report on the status of a browser. These functions may be accomplished in part by using functionality of the underlying browser, the operating system, or other cryptographic libraries and modules.

Each participant is also preferably provided with a trusted component database 221 for storing hashes, as shown in FIG. 4. In a preferred embodiment, trusted component database 221 stores, for each browser component used by one or more subscribing customers, the identities and digital certificates of those entities authorized to certify the integrity of the browser component. Trusted component database 221 may also preferably store known-good hashes for each such browser component, as described below.

Figure 6:
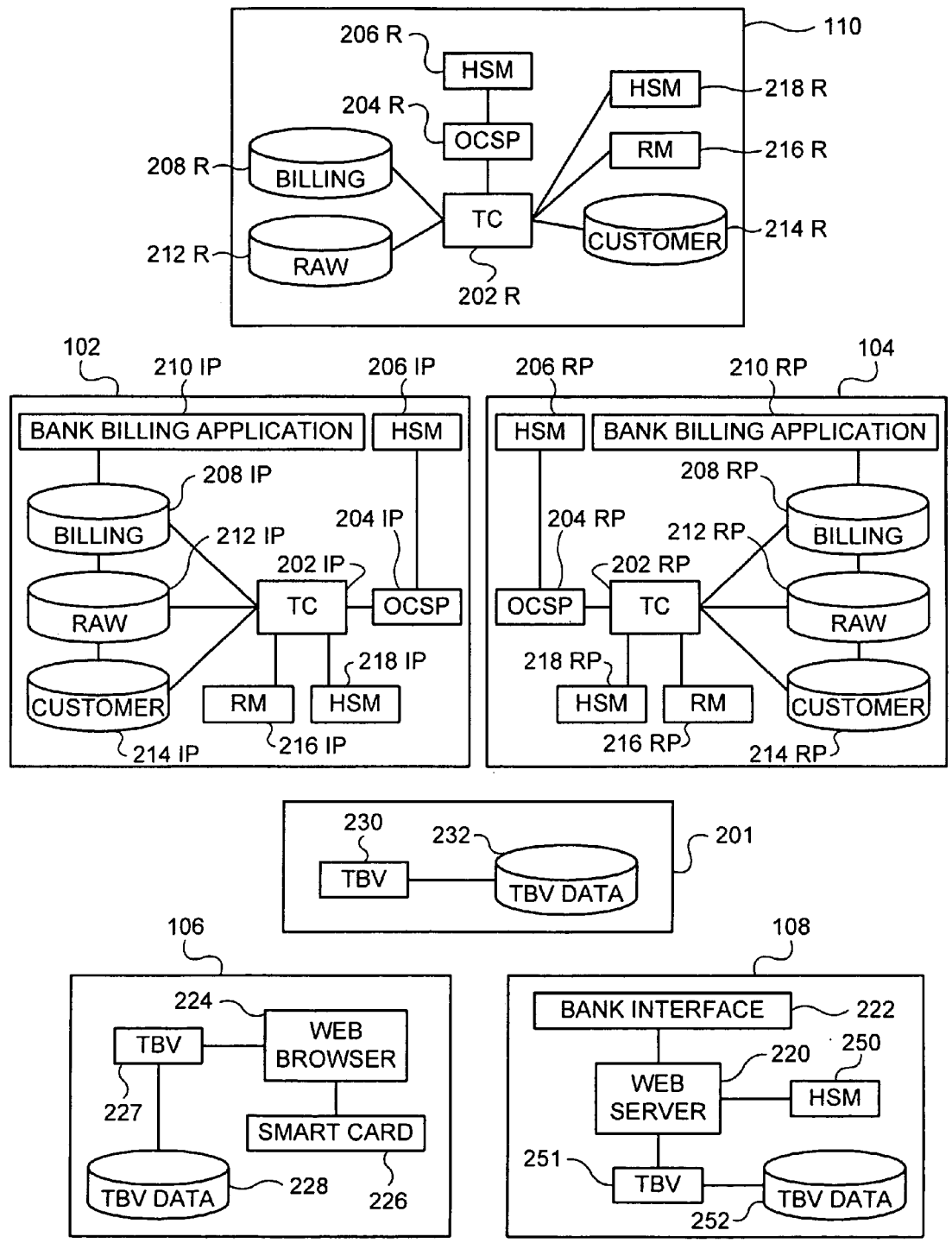
FIG. 6 schematically illustrates the components preferably provided at each system entity in the preferred embodiments that employ a distinct trusted verifier entity.

In a preferred distinct-verifier embodiment, trusted browser verification is preferably provided by a trusted browser verifier entity 201. Accordingly, that entity is preferably provided with a trusted browser verification component 230 and a trusted component database 232. FIG. 6 schematically illustrates the components preferably provided at each entity in a preferred distinct-verifier embodiment.

As further shown in FIGS. 4 and 6, relying customer 108 is preferably provided with a Web server 220 adapted to receive and transmit information via the Internet. Relying customer 108 is further preferably provided with a bank interface 222 for accessing system services, as described in more detail below. An exemplary bank interface is described in copending application Ser. No. 09/657,604, filed on Sep. 8, 2000, entitled System and Method for Facilitating Access by Sellers to Certificate-Related and Other Services. Relying customer 108 is preferably further provided with a hardware security module 250 for signing and verifying signatures on messages. Relying customer 108 is preferably further provided with a trusted browser verification component 251 and a trusted component database 252.

In a preferred embodiment, subscribing customer 106 is preferably provided with a trusted browser verification component 227. Trusted browser verification component 227 comprises code that is adapted to create hashes, compare hashes, sign hashes, verify signatures, store signatures, retrieve signatures, send and retrieve signatures, and generate a report on the status of a browser. Trusted browser verification component 227 may generate a hash from a copy of a browser and any browser components actually running on the buyer's computer at the time the hash is made. Alternatively, the hash may be generated from a copy of the browser and any browser components stored in non-volatile memory at the buyer's computer, for example stored on the buyer's hard drive. Such hash may be generated and stored when an applet is downloaded or when the browser is launched and the plug-ins are loaded.

Preferably, the software for implementing trusted browser verification as described herein may be distributed to customers in a number of different ways. First, root entity 110 may distribute the software to browser manufacturers or permit browser manufacturers to create software for implementing the functionality described herein. These manufacturers may incorporate this software into a browser for distribution to customers. Second, trusted verifier 201 may distribute appropriate code to customers as a plug-in or as a library for their browsers. Third, trusted verifier 201 may distribute appropriate code as an applet that customers may download.

As further shown in FIG. 4, subscribing customer 106 is further preferably provided with a Web browser 224 adapted to receive and transmit information via the Internet. Subscribing customer 106 preferably receives Web browser 224 from trusted verifier 201 or other sources. If subscribing customer 106 receives Web browser 224 from trusted verifier 201, the code that comprises Web browser 224 is preferably signed by trusted verifier 201. If subscribing customer 201 receives Web browser 224 from another source, the browser code may or may not be signed.

Subscribing customer 106 may also receive other browser components, such as plug-ins or applets, and other components, such as proxies, from trusted verifier 201 or other sources. Some or all of these other browser components may be signed by the manufacturer or another entity. Others of such components may be unsigned.

Subscribing customer 106 preferably stores the digital signatures for all browser components that it receives in a trusted component database 228. Trusted component database 228 may also be used to store known-good hashes of these components, as described below.

In a preferred embodiment, each system entity is preferably provided with a smart card for signing messages. In addition, each system entity is further preferably provided with two digital certificates (with corresponding private keys) to facilitate authentication: an identity certificate and a utility certificate.

The identity private key is used to produce digital signatures that are required as evidence of an entity's contractual commitment to the contents of an electronic transaction, such as a purchase order.

The utility private key is used to produce digital signatures that allow additional transactional security via actions like, data encryption, key encryptions and exchange, establishment of encrypted channels with communicating parties via Secure Sockets Layer/Transport Layer Security (SSL/TLS), and for Internet Protocol Security (IPSec) authentication. Typically, utility certificates are used to support secure socket layer sessions, to encrypt S/MIME messages, and for other utility applications. Any reference in this document to the term "certificate" refers to an identity certificate unless otherwise stated.

Having described the system architecture and components, preferred embodiments for providing trusted browser verification are now described.

Trusted browser verification may be implemented in a number of ways. In a first preferred distinct-verifier embodiment, relying customer 108 may look to relying participant 104 to process a browser status request regarding Web browser 224. In this embodiment, relying participant 104 forwards the browser status request to trusted verifier 201 and returns to relying customer 108 a browser status response from trusted verifier 201.

Relying customer 108 may include its browser status request as part of a certificate validation request for subscribing customer 106's certificate or transmit it as a separate request. If relying customer 108 bundles the browser status request with a certificate validation request, then transaction coordinator $202_{RP}$ preferably forwards the browser status request to trusted verifier 201 and processes itself the certificate validation request as described in copending U.S. patent application Ser. No. 09/657,605, filed on Sep. 8, 2000, entitled System and Method for Providing Certificate Validation and Other Services.

In a second preferred distinct-verifier embodiment, relying customer 108 may send a browser status request directly to trusted verifier 201. Trusted verifier 201 checks the status of Web browser 224 and returns a browser status response directly to relying customer 106.

In a preferred participant-verifier embodiment, relying participant 104 may process a browser status request using transaction coordinator $202_{RP}$ and a trusted browser verification component $219_{RP}$ maintained at relying participant 104.

In other preferred embodiments, browser status requests may be received from, and responses to those requests may be sent to, subscribing customer 106.

In still other preferred embodiments, instead of transmitting browser status requests to trusted verifier 201, customers 106, 108 may receive a known-good set of hashes from trusted verifier 201 or trusted browser verification component 219. Customers 106, 108 may then compare these known-good hashes to those of buyer's browser components to verify their integrity.

Preferred operation of these embodiments is described below.

Figure 7:
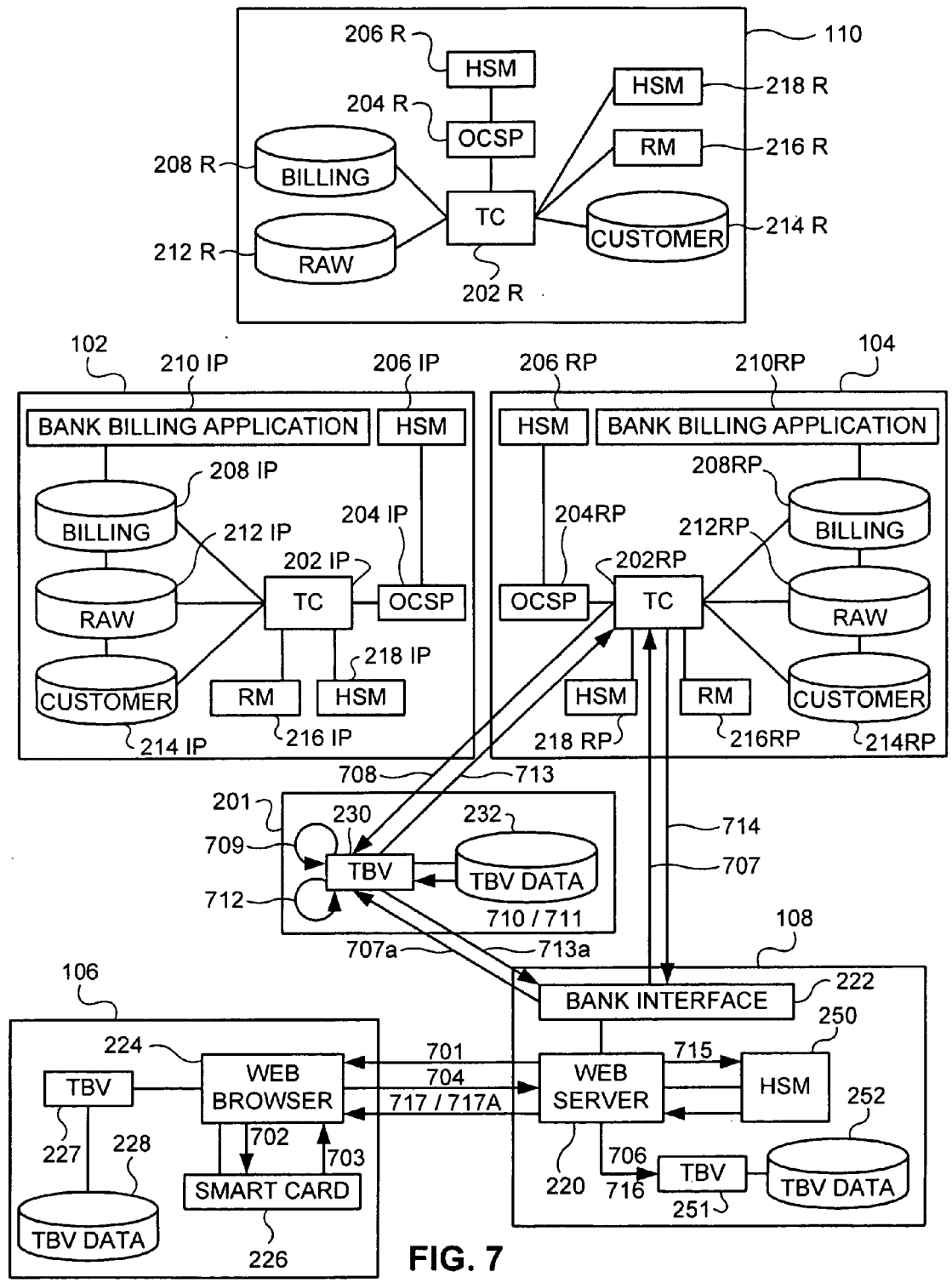
FIG. 7 is a composite block/flow diagram of a preferred embodiment in which the trusted verifier is a distinct entity.

FIG. 7 schematically illustrates trusted browser verification in a preferred distinct-verifier embodiment. In step 701, relying customer 108 sends subscribing customer 106 a purchase order. In step 702, Web browser 224 invokes a signing interface that sends the purchase order to smart card 226 for signature. A suitable signing interface is described in copending provisional patent application Ser. No. 60/224,994, filed Aug. 14, 2000, entitled Signing Interface Requirements, Smart Card Compliance Requirements, Warranty Service Functional Requirements, and Additional Disclosure, which is hereby incorporated by reference.

In step 703, the purchase order is signed. In a preferred embodiment, when the signature is a PKCS #7 signature, the digital signatures of all signed components running in the buyer's browser environment are retrieved from trusted component database 228 and included as authenticated attributes in the PKCS #7 signature. Alternatively, when the signature is an XML digital signature, the digital signatures of all signed components running in the browser environment are included in the XMLDSIG as signed attributes.

In a further preferred embodiment, any unsigned code running in the browser environment is preferably included as an authenticated or signed attribute in the buyer's digital signature. This code may preferably be copied from RAM (i.e., the particular instance of the unsigned code currently running). Alternatively, it may be copied from non-volatile memory at the buyer's computer, such as the buyer's hard drive.

In a further preferred embodiment, trusted browser verification component 227 hashes the code of all signed browser components actually running at the time the purchase order is signed. The code for these signed browser components may preferably be retrieved from RAM (i.e., the actual instance of the signed browser components currently running). Alternatively, this code may be retrieved from non-volatile memory at the buyer's computer, such as the buyer's hard drive. A hash of each such component is then created, and included as an authenticated or signed attribute in the digital signature created in step 703.

FIG. 8 summarizes the digitally signed content including authenticated or signed attributes in each of the three preferred embodiments described above for step 703. In particular, as shown in FIG. 8, in the first preferred embodiment described above, the buyer's digital signature is executed on:

(1) the purchase order; and
(2) the digital signature of each signed component running in the browser environment.

By contrast, in the first further preferred embodiment described above, the buyer's digital signature is executed on:

(1) the purchase order;
(2) the digital signature of each signed component running in the browser environment; and
(3) any unsigned code running in the browser environment.

By contrast, in the second further preferred embodiment described above, the buyer's digital signature is executed on:

(1) the purchase order;
(2) the digital signature of each signed component running in the browser environment;
(3) any unsigned code running in the browser environment; and
(4) the code of each signed component running in the browser environment.

In step 704, subscribing customer 106 sends the signed purchase order (including its authenticated or signed attributes) to relying customer 108. In step 705, relying customer 108 receives the signed purchase order and authenticates the subscribing customer's signature using the subscribing customer's certificate. If the second further preferred embodiment described above is implemented, the relying customer also compares the hashes created by subscribing customer 106 for all digitally signed components to the hashes in the digital signatures of those components for an added degree of security that the code actually running or stored in non-volatile memory on the buyer's computer is in fact the code verified by the trusted entity's signature.

In step 706, trusted browser verification component 251 of relying customer 108 extracts from the signed purchase order the digital signatures of all signed components running on the subscribing customer's browser and generates a browser status request for these components. The buyer's signature on the unsigned code may also preferably be included in this request, if the first further preferred embodiment described above is implemented.

In step 707, relying customer 108 signs the browser status request and sends it to relying participant 104 via bank interface 222. As noted above, relying customer 108 may bundle the browser status request with a certificate validation request for subscribing customer 106's certificate. If a certificate validation request is bundled with the browser status request, then transaction coordinator 202 preferably processes the certificate validation request as described in copending U.S. patent application Ser. No. 09/657,605, filed on Sep. 8, 2000 entitled System and Method for Providing Certificate Validation and Other Services. In step 708, transaction coordinator $202_{RP}$ forwards the browser status request to trusted verifier 201.

In step 709, for each browser component included in the browser status request, trusted verifier 201 identifies the entity that signed the digital signature and verifies the authenticity of that digital signature, using, for example, the signer's certificate. In addition, trusted verifier 201 may validate the entities certificate, if desired.

In step 710, trusted verifier 201 retrieves from trusted component database 232 the identities of those entities authorized to certify the trustworthiness of each browser component in the browser status request. It then determines whether the entity that executed the digital signature on each signed component is authorized to do so. For example, if the component is the Netscape COMMUNICATOR™ browser, NETSCAPE™ (i.e., the entity that created the component) may be designated as a trusted entity to certify the integrity of this component. Similarly, if the component was a MICROSOFT™ applet downloaded by the user, MICROSOFT™ might be designated a trusted entity to certify the integrity of this component. Alternatively or in addition, issuing participant 102 may be designated a trusted entity authorized to certify browser components running on its' customers' computers (e.g., subscribing customer 106). Alternatively or in addition, another system entity, such as trusted verifier 201, may be designated a trusted entity to certify the integrity of one or more browser components.

In addition, if desired, all customers 106 may be identified as authorized to certify otherwise unsigned code running on their computers. Alternatively, these customers may be required to pre-register otherwise unsigned code with trusted verifier 201 by signing the code and formally assuming responsibility for its trustworthiness.

In a preferred embodiment, known-good hashes of browser components to be verified are available to trusted verifier 201. Trusted verifier may store these known-good hashes in its trusted component database 232 or alternatively may obtain these known-good hashes on an "as needed" basis from the entity that executed the digital signature certifying the component when a request to verify the component is received. In this preferred embodiment, as shown in step 711, trusted verifier 201 retrieves or obtains a known-good hash of each browser component to be verified, and compares it to the hash contained in the digital signature for that component included in the browser status request.

In step 712, trusted verifier 201 generates a browser status response. In a preferred embodiment, this response may take on one of three values: (1) GOOD; (2) BAD; or (3) UNKNOWN. FIG. 9 demonstrates one preferred embodiment for determining the value of a browser status response depending on the results of steps 710–711. In particular, as shown in FIG. 9, in this preferred embodiment, if the hash of any browser component does not match the known-good hash stored by trusted verifier 201, then the browser status response returns BAD. If, however, the hash matches the stored known-good hash, but the entity that executed the digital signature either can not be determined or is not authorized to certify the trustworthiness of the browser component, then the browser status response returns UNKNOWN. Finally, if the hash matches the stored known-good hash and the entity that executed the digital signature is authorized to certify the trustworthiness of the browser component, then the browser status response returns GOOD.

As will be recognized, other alternative rule sets for determining whether a browser status response should return GOOD, BAD, or UNKNOWN may be employed. One alternative rule set for determining browser status responses is illustrated in FIG. 10. Preferably, the rule set for making these determinations is determined according to the trust model employed by the system and selected by a policy management authority for the system.

In step 713, trusted verifier 201 signs the browser status response and transmits it to transaction coordinator $202_{RP}$. In step 714, transaction coordinator $202_{RP}$ forwards the browser status response to relying customer 108.

In step 715, relying customer 108 verifies trusted verifier 201's signature on the hash response (using, e.g., its certificate). In addition, relying customer 108 may validate trusted verifier 201's certificate, if desired. In step 716, relying customer 108 reviews the status report generated by trusted verifier 201. The final decision on whether or not to use the information on the status of Web browser 224 and in what manner preferably rests with relying customer 108. Alternatively, relying customer 108 may be required to act in a particular manner (e.g., disaffirming a transaction) depending on the browser status response (e.g., if the response is BAD). Such requirements may, for example, be specified in system operating rules, such as those described in the above-cited application Ser. No. 09/657,623. In step 717, relying customer 108 sends a message to subscribing customer 106 either confirming or disaffirming the transaction.

In a second preferred distinct-verifier embodiment, relying customer 108 may instead send the browser status request directly to trusted verifier 201, as indicated at step 707a. Trusted verifier 201 preferably performs trusted browser verification as described above. In step 713a, trusted verifier 201 generates a report on the trusted status of Web browser 224 and sends the status report to relying customer 108. Relying customer 108 reviews the status report generated by trusted verifier 201. In step 717a, relying customer 108 sends a message to subscribing customer 106 either confirming or disaffirming the transaction. In alternative versions of these embodiments, the status requester may be subscribing customer 106, which may transmit the browser status request to trusted verifier 201 either directly or via its issuing participant 102.

Figure 11:
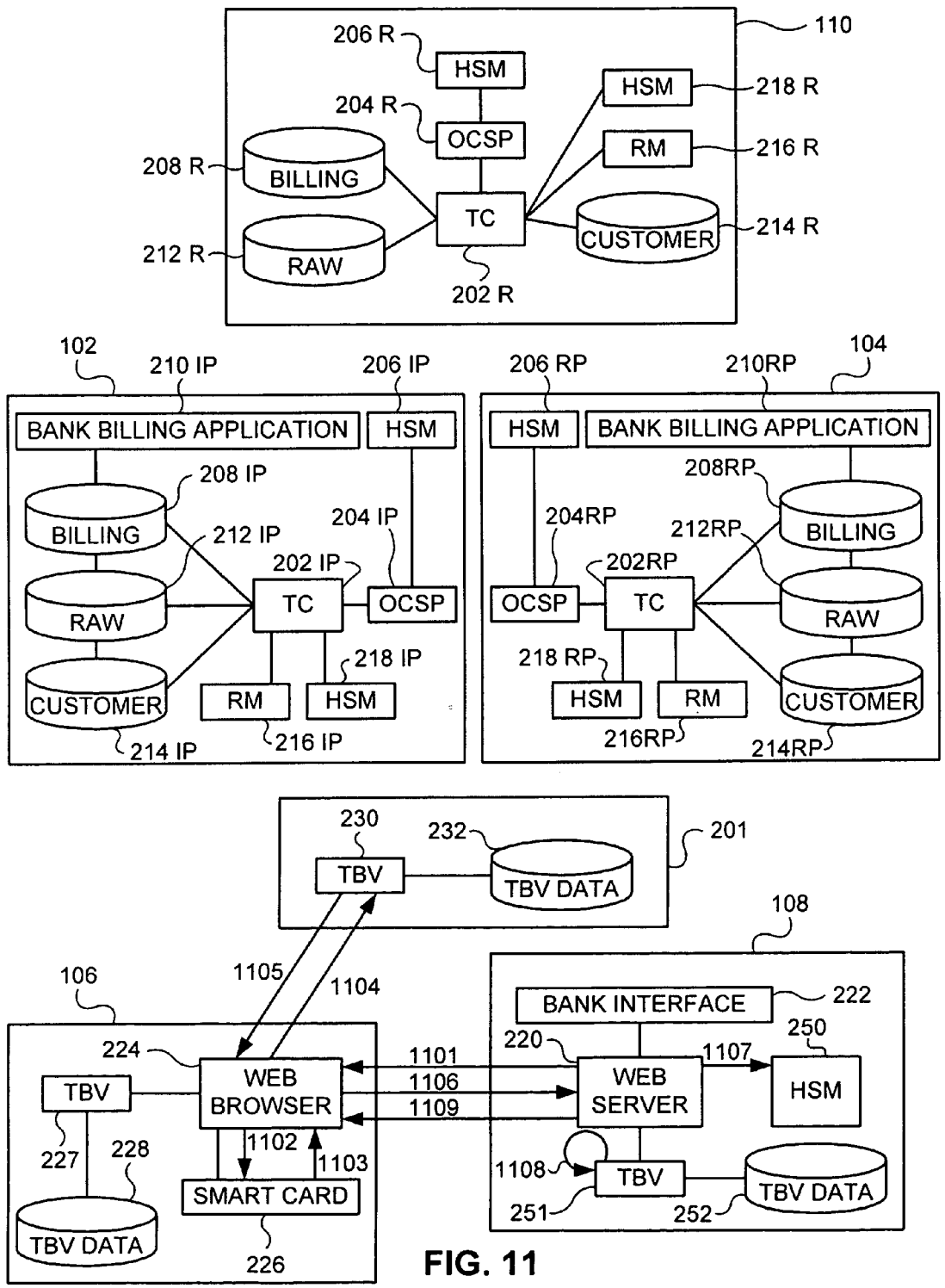
FIG. 11 is a composite block/flow diagram of a second preferred embodiment in which the trusted verifier is a distinct entity.

FIG. 11 schematically illustrates trusted browser verification in a third preferred distinct-verifier embodiment. In step 1101, relying customer 108 sends subscribing customer 106 a purchase order. In step 1102, Web browser 224 invokes a signing interface that sends the purchase order to smart card 226 for signature.

In step 1103, the purchase order is signed. As noted above, the executed digital signature preferably comprises authenticated or signed attributes that include all digital signatures of components running in the browser environment and may include additional authenticated or signed attributes as described in the first and second further preferred embodiments.

In step 1104, subscribing customer 106 transmits a hash request to trusted verifier 201 requesting a set of known-good hashes corresponding to the browser components running in its browser environment. In step 1105, trusted verifier 201 retrieves the known-good hashes for those components and includes them in a signed hash response to subscribing customer 106.

In step 1106, subscribing customer 106 sends the signed purchase order and the hash response to relying customer 108. In step 1107, relying customer 108 verifies trusted verifier 201's signature on the hash response (using, e.g., its certificate). In addition, relying customer 108 may also validate trusted verifier 201's certificate, if desired. In step 1108, relying customer 108 compares the known-good hashes in the hash response to those of the components running in the buyer's browser environment to confirm the status of Web browser 224. In step 1109, relying customer 108 sends a message to subscribing customer 106 either confirming or disaffirming the transaction.

In a fourth preferred distinct-verifier embodiment, the hash request and/or hash response may be exchanged between relying customer 108 and trusted verifier 201.

Figure 12:
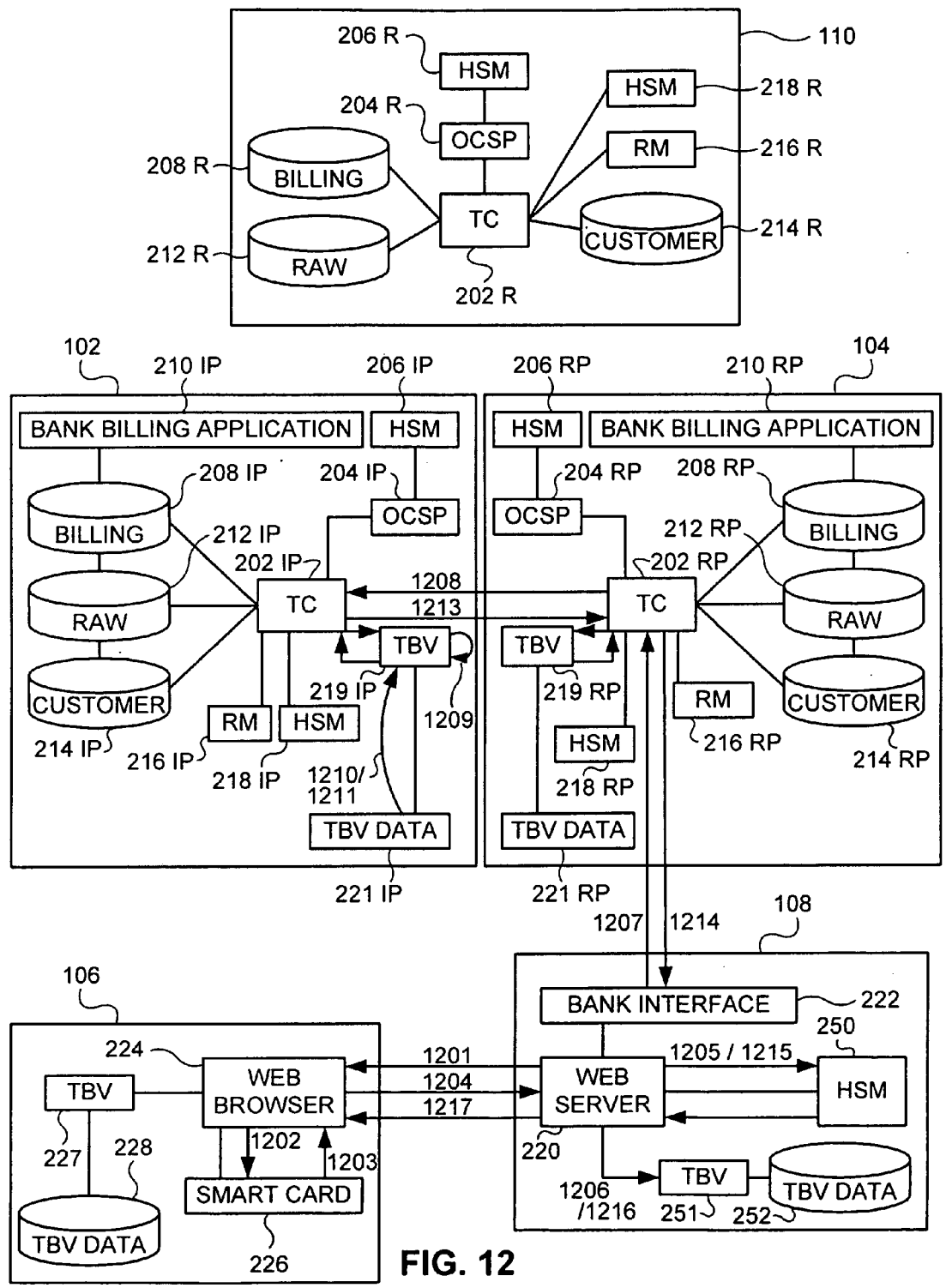
FIG. 12 is a composite block/flow diagram illustrating a preferred embodiment in which the trusted verifier is incorporated in a participant's transaction coordinator.

FIG. 12 schematically illustrates trusted browser verification in a preferred participant-verifier embodiment. In step 1201, relying customer 108 sends subscribing customer 106 a purchase order. In step 1202, Web browser 224 invokes a signing interface that sends the purchase order to smart card 226 for signature.

In step 1203, the purchase order is signed. As noted above, the executed digital signature preferably comprises authenticated or signed attributes that include all digital signatures of components running in the browser environment and may include additional authenticated or signed attributes as described in the first and second further preferred embodiments.

In step 1204, subscribing customer 106 sends the signed purchase order (including its authenticated or signed attributes) to relying customer 108. In step 1205, relying customer 108 receives the signed purchase order and authenticates the subscribing customer's signature using the subscribing customer's certificate. If the second further preferred embodiment described above is implemented, the relying customer also compares the hashes created by subscribing customer 106 for all digitally signed components to the hashes in the digital signatures of those components for an added degree of security that the code actually running or stored on the buyer's computer is in fact the code verified by the trusted entity's signature.

In step 1206, trusted browser verification component 251 of relying customer 108 extracts from the signed purchase order the digital signatures of all signed components running on the subscribing customer's browser and generates a browser status request for these components. The buyer's signature on the unsigned code may also preferably be included in this request, if the first further preferred embodiment described above is implemented.

In step 1207, relying customer 108 signs the browser status request and sends it to relying participant 104 via bank interface 222. As noted above, relying customer 108 may bundle the browser status request with a certificate validation request for subscribing customer 106's certificate. In step 1208, relying participant 104 forwards the request to issuing participant 102.

In step 1209, for each browser component included in the browser status request, issuing participant 102 identifies the entity that signed the digital signature and verifies that digital signature, using, for example, the signer's certificate.

In step 1210, issuing participant 102 retrieves from trusted component database 232 the identities of those entities authorized to certify the trustworthiness of each browser component in the browser status request. It then determines whether the entity that executed the digital signature on each signed component is authorized to do so.

In a preferred embodiment, in step 1211, issuing participant 102 retrieves or obtains a known-good hash of each browser component to be verified, and compares it to the hash contained in the digital signature for that component included in the browser status request.

In step 1212, issuing participant 102 generates a browser status response. In step 1213, issuing participant 102 signs the browser status response and transmits it to transaction coordinator 202$_{RP}$ of relying participant 108. In step 1214, transaction coordinator 202$_{RP}$ signs and forwards the browser status response to relying customer 108.

In step 1215, relying customer 108 verifies the signatures on the browser status response (using, e.g., the certificates of participants 102, 104). In addition, relying customer 108 may validate those certificates, if desired. In step 1216, relying customer 108 reviews the status report generated by issuing participant. In step 1217, relying customer 108 sends a message to subscribing customer 106 either confirming or disaffirming the transaction.

While the invention has been described in conjunction with specific embodiments, it is evident that numerous alternatives, modifications, and variations will be apparent to those skilled in the art in light of the foregoing description.

What is claimed is:

1. A method for verifying the trustworthiness of executable Web browser software, said method comprising the steps of:

transmitting via a distributed network an electronic document requiring a digital signature from a first user computer to a second user computer;

electronically signing the electronic document by executable browser software at the second user computer to create a first digital signature, wherein the first digital signature is affixed to a combination comprising content plus a second digital signature wherein the second digital signature is affixed to, and thus verifies the authenticity of, at least one executable component running in an environment of the executable browser software;

transmitting the signed electronic document from the second user computer to the first user computer; and subsequent to the two transmitting steps and the electronically signing step, authenticating the second digital signature, thereby verifying the trustworthiness of the executable browser software.

2. The method of claim 1, further comprising the step, of determining whether the entity that executed the second digital signature is authorized to certify the trustworthiness of the at least one component.

3. The method of claim 1, wherein the authenticating step comprises verifying the authenticity of the second digital signature.

4. The method of claim 3, wherein the authenticity of the second digital signature is verified by checking a digital certificate associated with said second digital signature.

5. The method of claim 1, wherein said combination further comprises a hash of the at least one component running in the executable browser software environment, said method further comprising the step of comparing said hash to a known-good hash of the at least one component.

6. The method of claim 1, wherein the authenticating is performed by the first user computer.

7. The method of claim 1, wherein the authenticating step is performed by a computer maintained by a participant.

8. The method of claim 1, wherein the authenticating is performed by an independent entity that is not a participant.

9. The method of claim 1, wherein the authenticating is performed by the second user computer.

10. The method of claim 1, wherein an said combination further comprises an executable component running in the browser software environment of the second user computer.

11. The method of claim 10, wherein the unsigned executable component is copied from RAM of the second user computer.

12. The method of claim 10, wherein the unsigned executable component is copied from non-volatile memory of the second user computer.

13. A method for verifying the trustworthiness of an executable Web browser software module, said method comprising the step of:

creating a first set known-good hashes, the first set for known-good hashes comprising: a hash of the Web browser software module at a first point in time, and a plurality of hashes corresponding to the plurality of executable browser components at the first point in time;

determining the status of the Web browser module at a second point in time by creating a second set of hashes, the second set of hashes comprising:

a hash of the Web browser software module at the second point in time, and
a plurality of hashes corresponding to the plurality of executable browser components at the second point in time;
verifying the second set of hashes to ensure that each hash was created by a trusted source; and
subsequent to the executable Web browser software module having executed by virtue of having digitally signed an electronic document, comparing the first set of hashes to the second set of hashes to determine the trustworthiness of the Web browser software module.

14. The method of claim 13, wherein the second point in time is subsequent to the first point in time.

15. The method of claim 13, wherein the determining step further comprises verifying the status of the Web browser software module when the first set of hashes matches the second set of hashes.

16. The method of claim 13, wherein the determining step further comprises determining that the status of the Web browser software module is bad when the first set of hashes does not match the second set of hashes.

17. The method of claim 13, wherein the determining step further comprises determining that the status of the Web browser software module is unknown when it is not determined that a hash in the second set of hashes was created by a trusted source.

18. The method of claim 13, wherein the determining step further comprises determining that the status of the Web browser software module is unknown when it is determined that a hash in the second set of hashes was not created by a trusted source.

19. The method of claim 13, wherein the first set of hashes is maintained by a trusted entity, said method further comprising the steps of:
receiving from a requestor a request to determine the trustworthiness of the Web browser software module, the request including the second set of hashes;
generating a report about the status of the Web browser module based on a result of the determining step; and
transmitting the report to the requestor.

20. The method of claim 19, wherein the steps of receiving, determining, generating, and transmitting are performed by the trusted entity.

21. The method of claim 13, wherein the second set of hashes comprises one or more hashes of browser components at a second point in time.

22. The method of claim 21, wherein the first set of hashes comprises hashes at a first point in time corresponding to the hashes in the second set of hashes.

23. The method of claim 22, wherein the second point in time is subsequent first point in time.

24. The method of claim 22, wherein at least one of the hashes in in the second set of hashes has been signed by a trusted source.

25. The method of claim 24, wherein the step of verifying further comprises for verifying that a hash in the second set of hashes was created by a trusted source, by verifying the signature on the hash.

26. The method of claim 13, wherein the browser status request is received from a first customer seeking to verify the trustworthiness of the Web browser software module running on a computer in the possession of a second customer.

27. The method of claim 26, wherein the first customer and the second customer are parties to a transaction.

28. The method of claim 27, wherein the first customer is a buyer and the second customer is a seller in the transaction.

29. The method of claim 26, wherein the second customer disaffirms the transaction based on the status of the Web browser software module.

30. Apparatus for providing trusted Web browser verification, said apparatus comprising:
a trusted verifier module;
coupled to the trusted verifier module, means for maintaining by the trusted verifier module a first set of hashes generated by a microprocessor, the first set of hashes comprising a first hash of an executable software browser and a first plurality of hashes corresponding to a plurality of executable browser components, the first set of hashes being a known-good set of hashes;
coupled to the trusted verifier module, means for receiving by the trusted verifier module a browser status request, the browser status request including a second set of hashes generated by a microprocessor, the second set of hashes comprising a second hash of the browser and a second plurality of hashes corresponding to a plurality of executable browser components;
coupled to the trusted verifier module, means for verifying by the trusted verifier module that each hash in the second set of hashes was created by a trusted source; and
coupled to the trusted verifier module, means for verifying by the trusted verifier module the status of the browser, subsequent to the browser having executed by virtue of having digitally signed an electronic document, based on the first set of hashes and the second set of hashes.

31. The apparatus of claim 30, wherein the trusted verifier module determines the status of the browser by comparing the first set of hashes with the second set of hashes.

32. The apparatus of claim 31, wherein the trusted verifier module verifies the status of the browser when the first set of hashes matches the second set of hashes.

33. The apparatus of claim 31, wherein the means for determining determines that the status of the browser is bad when the first set of hashes does not match the second set of hashes.

34. The apparatus of claim 31, wherein the means for determining determines that the status of the browser is unknown when it is not determined that a hash in the second set of hashes was created by a trusted source.

35. The apparatus of claim 31, wherein the means for determining determines that the status of the browser is unknown when it is determined that a hash in the second set of hashes was not created by a trusted source.

36. The apparatus of claim 30, wherein the second set of hashes comprises at least one hash of executable browser components at a second point in time.

37. The apparatus of claim 36, wherein the first set of hashes comprises hashes at a first point in time corresponding to the hashes in the second set of hashes.

38. The apparatus of claim 37, wherein the determining means is invoked at a second point in time subsequent to the first point in time.

39. The apparatus of claim 37, wherein at least one of the hashes in the second set of hashes has been signed by a trusted source.

40. The apparatus of claim 39, wherein the means for verifying verifies that a hash in the second set of hashes was created by a trusted source, by verifying the signature on the hash.

41. The apparatus of claim 30, wherein the browser status request is received from a first customer seeking to verify the trustworthiness of a browser running on a computer in the possession of a second customer.

42. The apparatus of claim 41, wherein the first customer and the second customer are parties to a transaction.

43. The apparatus of claim 42, wherein the first customer is a buyer and the second customer is a seller in the transaction.

44. The apparatus of claim 41, wherein the second customer disaffirms the transaction based on the status of the browser.

45. In conjunction with apparatus comprising a root entity, a first participant, a second participant, a first customer of the first participant, and a second customer of the second participant, a method for verifying the trustworthiness of an executable Web browser in possession of the first customer, said method comprising:
   a) maintaining at a trusted verifier module a first set of hashes, the first set of hashes comprising a first hash of the browser;
   b) generating by the first customer a second set of hashes, the second set of hashes comprising a second hash of the browser;
   c) transmitting by the first customer the second set of hashes to the second customer, using a network connection;
   d) generating by the second customer a browser status request, the browser status request including the second set of hashes;
   e) transmitting by the second customer the browser status request to the second participant;
   f) forwarding by the second participant the browser status request to the trusted verifier module;
   g) verifying by the trusted verifier module a status of the browser by comparing the first set of hashes with the second set of hashes;
   h) generating by the trusted verifier module a browser status response;
   i) forwarding by the trusted verifier module the browser status response to the second participant; and
   j) transmitting by the second participant the browser status response to the second customer.

46. The method of claim 45, wherein the status of the browser is verified when the first set of hashes matches the second set of hashes.

47. The method of claim 45, wherein the status of the browser is one of good, bad, or unknown.

48. The method of claim 45, wherein the trusted verifier module verifies that each hash in the second set of hashes was created by a trusted source.

49. The method of claim 48, wherein the status of the browser is verified when the first set of hashes matches the second set of hashes.

50. The method of claim 48, wherein the status of the browser is one of good, bad, or unknown.

51. The method of claim 45, wherein the first customer and the second customer are parties to a transaction.

52. The method of claim 51, wherein the first customer is a buyer and the second customer is a seller in the transaction.

53. The method of claim 52, wherein the second customer disaffirms the transaction based on the status of the browser.

54. The method of claim 45, wherein the root entity establishes a set of operating rules for the system.

55. The method of claim 45, wherein the first participant is a financial institution.

56. The method of claim 45, wherein the second participant is a financial institution.

57. The method of claim 45, wherein the first participant comprises a transaction coordinator for processing browser status requests.

58. The method of claim 45, wherein the second participant comprises a transaction coordinator for processing browser status requests.

59. The method of claim 45, wherein the trusted verifier module is an integrated component of the first participant.

60. The method of claim 45, wherein the trusted verifier module is an integrated component of the second participant.

61. The method of claim 45, wherein the trusted verifier module is a distinct entity from the first and second participants.

62. Apparatus for verifying the trustworthiness of an executable software browser in possession of a first customer, said apparatus comprising:
   a root entity;
   a first participant;
   a second participant;
   a first customer of the first participant;
   a second customer of the second participant;
   means for maintaining at a trusted verifier module a first set of hashes, the first set of hashes comprising a first hash of the browser;
   means for generating by the first customer a second set of hashes, the second set of hashes comprising a second hash of the browser;
   means for transmitting by the first customer the second set of hashes to the second customer using a network connection;
   means for generating by the second customer a browser status request, the browser status request including the second set of hashes;
   means for transmitting by the second customer the browser status request to the second participant;
   means for forwarding by the second participant the browser status request to the trusted verifier module;
   means for verifying by the trusted verifier module a status of the first customer's browser by comparing the first set of hashes with the second set of hashes;
   means for forwarding by the trusted verifier module the browser status response to the second participant; and
   means for transmitting by the second participant the browser status response to the second customer.

63. The apparatus of claim 62, wherein the status of the browser is verified when the first set of hashes matches the second set of hashes.

64. The apparatus of claim 62, wherein the status of the browser is one of good, bad, or unknown.

65. The apparatus of claim 62, wherein the trusted verifier module verifies that each hash in the second set of hashes was created by a trusted source.

66. The apparatus of claim 65, wherein the trusted verifier module determines the status of the browser by comparing the first set of hashes with the second set of hashes.

67. The apparatus of claim 66, wherein the status of the browser is verified when the first set of hashes matches the second set of hashes.

68. The apparatus of claim 67, wherein the status of the browser is one of good, bad, or unknown.

69. The apparatus of claim 62, wherein the first customer and the second customer are parties to a transaction.

70. The apparatus of claim 62, wherein the first customer is a buyer and the second customer is a seller in the transaction.

71. The apparatus of claim 62, wherein the second customer disaffirms the transaction based on the status of the browser.

72. The apparatus of claim 62, wherein the root entity establishes a set of operating rules for the system.

73. The apparatus of claim 62, wherein the first participant is a financial institution.

74. The apparatus of claim 62, wherein the second participant is a financial institution.

75. The apparatus of claim 62, wherein the first participant comprises a transaction coordinator for processing browser status requests.

76. The apparatus of claim 62, wherein the second participant comprises a transaction coordinator for processing browser status requests.

77. The apparatus of claim 62, wherein the trusted verifier module is an integrated component of the first participant.

78. The apparatus of claim 62, wherein the trusted verifier module is an integrated component of the second participant.

79. The apparatus of claim 62, wherein the trusted verifier module is a distinct entity from the first and second participants.

* * * * *